(12) United States Patent
Namiki et al.

(10) Patent No.: US 11,741,367 B2
(45) Date of Patent: Aug. 29, 2023

(54) APPARATUS AND METHOD FOR IMAGE PROCESSING TO CALCULATE LIKELIHOOD OF IMAGE OF TARGET OBJECT DETECTED FROM INPUT IMAGE

(71) Applicant: FANUC CORPORATION, Yamanashi (JP)

(72) Inventors: Yuuta Namiki, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 681 days.

(21) Appl. No.: 16/812,369

(22) Filed: Mar. 9, 2020

(65) Prior Publication Data

US 2020/0210702 A1 Jul. 2, 2020

Related U.S. Application Data

(63) Continuation of application No. 15/899,471, filed on Feb. 20, 2018, now abandoned.

(30) Foreign Application Priority Data

Mar. 13, 2017 (JP) .................... 2017-047444

(51) Int. Cl.
*G06V 10/25* (2022.01)
*G06V 10/82* (2022.01)
(Continued)

(52) U.S. Cl.
CPC .......... *G06N 3/084* (2013.01); *G06F 18/214* (2023.01); *G06F 18/2413* (2023.01); *G06N 3/088* (2013.01); *G06T 7/73* (2017.01); *G06T 7/75* (2017.01); *G06V 10/25* (2022.01); *G06V 10/40* (2022.01); *G06V 10/764* (2022.01); (Continued)

(58) Field of Classification Search
None
See application file for complete search history.

(56) References Cited

U.S. PATENT DOCUMENTS

2008/0172781 A1\* 7/2008 Popowich ............... G09F 27/00
4/476
2010/0208983 A1 8/2010 Iwai et al.
(Continued)

FOREIGN PATENT DOCUMENTS

CN 104573669 A 4/2015
CN 105144239 A 12/2015
(Continued)

OTHER PUBLICATIONS

Aboutalib, S.—"Multiple-Cue Object Recognition for Interactionable Objects"—Dec. 8, 2010, pp. 1-92 (Year: 2010).\*
(Continued)

*Primary Examiner* — Bernard Krasnic
(74) *Attorney, Agent, or Firm* — HAUPTMAN HAM, LLP

(57) ABSTRACT

An image processing apparatus, which receives an input image and detects an image of a target object based on a detection algorithm, includes a machine learning device which performs learning by using a plurality of partial images cut out from at least one input image, based on a result of detection of the image of the target object, and calculates a likelihood of the image of the target object.

10 Claims, 13 Drawing Sheets

(51) Int. Cl.

| | |
|---|---|
| *G06N 3/084* | (2023.01) |
| *G06T 7/73* | (2017.01) |
| *G06V 20/10* | (2022.01) |
| *G06V 10/40* | (2022.01) |
| *G06V 10/94* | (2022.01) |
| *G06F 18/214* | (2023.01) |
| *G06F 18/2413* | (2023.01) |
| *G06V 10/764* | (2022.01) |
| *G06V 10/774* | (2022.01) |
| *G06N 3/088* | (2023.01) |
| *G06N 3/063* | (2023.01) |
| *B25J 9/16* | (2006.01) |

(52) U.S. Cl.
CPC ............ *G06V 10/774* (2022.01); *G06V 10/82* (2022.01); *G06V 10/955* (2022.01); *G06V 20/10* (2022.01); *B25J 9/1697* (2013.01); *G06N 3/063* (2013.01); *G06T 2207/20081* (2013.01); *G06T 2207/20084* (2013.01); *G06V 2201/06* (2022.01)

(56) References Cited

U.S. PATENT DOCUMENTS

| | | |
|---|---|---|
| 2013/0011012 A1 | 1/2013 | Yonaha |
| 2014/0307917 A1 | 10/2014 | Mei et al. |
| 2016/0070976 A1 | 3/2016 | Aoba |
| 2017/0028562 A1 | 2/2017 | Yamazaki et al. |
| 2017/0243077 A1 | 8/2017 | Fukui et al. |
| 2018/0222057 A1 | 8/2018 | Mizobe et al. |

FOREIGN PATENT DOCUMENTS

| | | |
|---|---|---|
| CN | 105574527 A | 5/2016 |
| CN | 105976401 A | 9/2016 |
| CN | 106295636 A | 1/2017 |
| JP | 2010-191772 A | 9/2010 |
| JP | 2010-198361 A | 9/2010 |
| JP | 5234833 B2 | 7/2013 |
| JP | 2013-206259 A | 10/2013 |
| JP | 2016-18538 A | 2/2016 |
| JP | 2016-057918 A | 4/2016 |
| JP | 2016-062524 A | 4/2016 |
| JP | 2017-30135 A | 2/2017 |
| WO | 2014/084218 A1 | 6/2014 |
| WO | WO-2017171891 A1 * | 10/2017 |

OTHER PUBLICATIONS

Wu, Bo and Nevatia, Ram, Improving Part based Object Detection by Unsupervised, Online Boosting, In: 2007 IEEE Conference on Computer Vision and Pattern Recognition. IEEE, 2007, 8pp.

* cited by examiner

CORRECT DETECTION   THRESHOLD VALUE Tha   INCORRECT DETECTION

THRESHOLD VALUE Thb   CORRECT DETECTION

APPARATUS AND METHOD FOR IMAGE PROCESSING TO CALCULATE LIKELIHOOD OF IMAGE OF TARGET OBJECT DETECTED FROM INPUT IMAGE

RELATED APPLICATIONS

The present application is a Continuation of U.S. application Ser. No. 15/899,471 filed on Feb. 20, 2018, which claims priority to Japanese Patent Application No. 2017-047444 filed on Mar. 13, 2017, the disclosures of which are hereby incorporated by reference herein in their entireties.

BACKGROUND OF THE INVENTION

1. Field of the Invention

The present invention relates to an apparatus and a method for image processing to calculate a likelihood of an image of a target object detected from an input image.

2. Description of the Related Art

Conventionally, for example, when an image processing apparatus is used to detect an image of a certain target object from the images in the field of vision of an image capture apparatus, feature quantity matching is performed between a piece of reference information representing the target object (generally called a model pattern, a template, or the like) and the input images obtained by the image capture apparatus. It is common to judge that an image of the target object has been successfully detected when, for example, the degree of correspondence between the model pattern and the image of the target object exceeds a designated level (threshold value).

When the threshold value of the degree of correspondence is too low, images not representing the target object are detected (false positive detection) and when the threshold value of the degree of correspondence is too high, images ought to be detected as the target object are not detected (false negative detection). To deal with this problem, adjustments of detection parameters including the threshold value of the degree of correspondence are conducted through trial and error, for example, by an operator repeating detections many times.

Conventionally, for example, Japanese Laid-open Patent Publication No. 2016-057918 discloses an image processing apparatus to learn segmentation from a plurality of images for learning and region teacher data to perform segmentation based on the result of the learning, and then to generate new images for learning by combining the properly segmented regions with the regions not properly segmented as a result of the segmentation, to perform renewed learning of segmentation by using the new images.

Conventionally, for example, Japanese Laid-open Patent Publication No. 2010-191772 discloses a learning apparatus to use positive images with the target object appearing therein and negative images without the target object appearing therein as generative images, from which to extract feature points; then to apply filtering to the generative images using a plurality of filters to obtain a filtered images; and to calculate a statistic of pixel values for each of the sub-regions around the feature points of the filtered images, to learn to correctly recognize the object to be recognized using the calculated statistics as feature quantities of the feature points.

Conventionally, for example, Japanese Laid-open Patent Publication No. 2016-062524 discloses a data processing system to segment an input image to regions and put a teacher label to each segmented region to perform a learning, based on images cut out from the regions and the teacher labels, to detect regions containing an image of the target object from the image, based on the model obtained by the learning.

Conventionally, for example, Japanese Examined Patent Publication No. 5234833 discloses a facial expression recognition apparatus to extract, from the image data, the regions containing an image of human face with an expression that matches a specified keyword to perform learning by inputting the feature quantities obtained from the regions into a learning device, thereby generating a discriminator to discriminate human facial expressions.

Conventionally, for example, International Publication Pamphlet WO2014/084218 discloses a target object detection apparatus to segment an input image into regions and apply a mask to the segmented sub-regions that contain no image of the target object, to perform learning by extracting features from the parts other than the masked regions and inputting the features to a learning device, and to determine whether or not specified regions in the image contain an image of the target object using a discriminator obtained by the learning.

As described above, for example, adjustments of detection parameters including the threshold value of the degree of correspondence between the model pattern and the target object are conducted through trial and error, for example, by an operator repeating detections many times. The definition of the degree of correspondence is dependent upon, for example, the detection algorithm. In other words, the degree of correspondence is calculated using only the image features used in a particular detection algorithm. For example, when the algorithm used is one for detecting a target object by using features of edge points in the image, such as the Generalized Hough Transform, the degree of correspondence is calculated based on the degree of correspondence of the edge points and so images having corresponding edges may be detected even when it is obvious to human eye that they are wrong ones.

In other words, it takes trouble to adjust the detection parameters so that only the objects intended by the operator may be detected. In addition, it may not be possible to achieve the detection of only the objects intended by the operator by using the degree of correspondence calculated according to the detection algorithm. An option in addressing such a case is to calculate a likelihood (probability of a rightly detected image of the target object or plausibility of an image of the target object, likelihood of successful detection) based on the result of detection according to the detection algorithm and determine whether or not the object is detected, based on the likelihood. For example, it may be preferable to calculate a likelihood by giving greater weights to some parts and smaller weights to other parts. Further, there may be a case in which it is preferable to calculate (compute) a likelihood by using features other than those used in the detection algorithm.

An object of the present invention is to provide an apparatus and a method for image processing to properly calculate a likelihood of the image of the target object to correctly detect the target object.

SUMMARY OF INVENTION

According to a first aspect of the present invention, there is provided an image processing apparatus which receives an input image and detects an image of a target object based on a detection algorithm, including a machine learning device which performs learning by using a plurality of partial images cut out from at least one input image, based on a result of detection of the image of the target object, and calculates a likelihood of the image of the target object.

According to a second aspect of the present invention, there is provided an image processing method for receiving an input image and detecting an image of a target object based on a detection algorithm, including performing machine learning by using a plurality of partial images cut out from at least one input image based on a detection result of the image of the target object to calculate a likelihood of the image of the target object.

BRIEF DESCRIPTION OF THE DRAWINGS

The present invention will be understood more clearly by referring to the following accompanying drawings.

DETAILED DESCRIPTION

Figure 1:
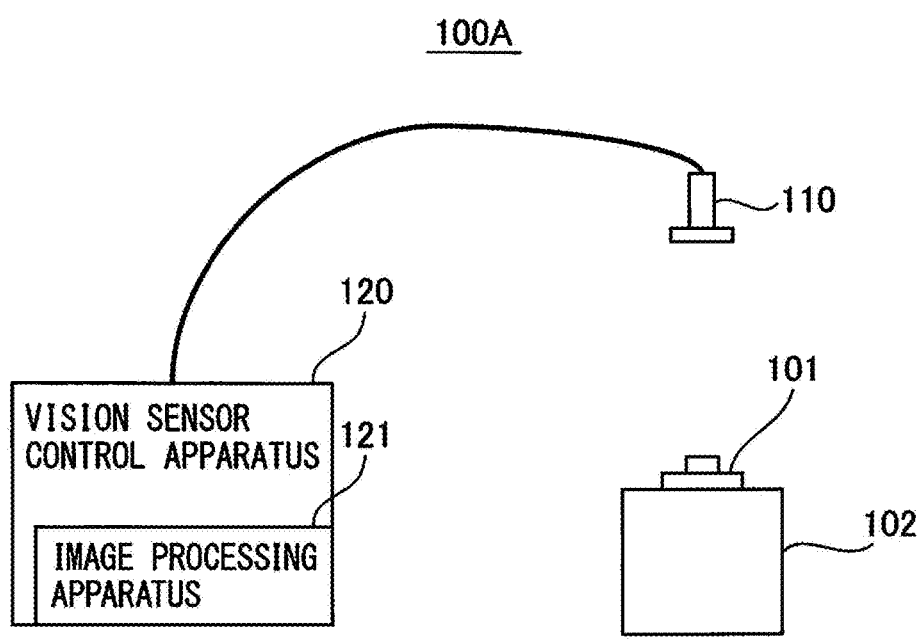
FIG. 1 is a schematic diagram illustrating an example of a machine tool system including a vision sensor control apparatus to which an image processing apparatus of the present invention is applied.
Figure 2:
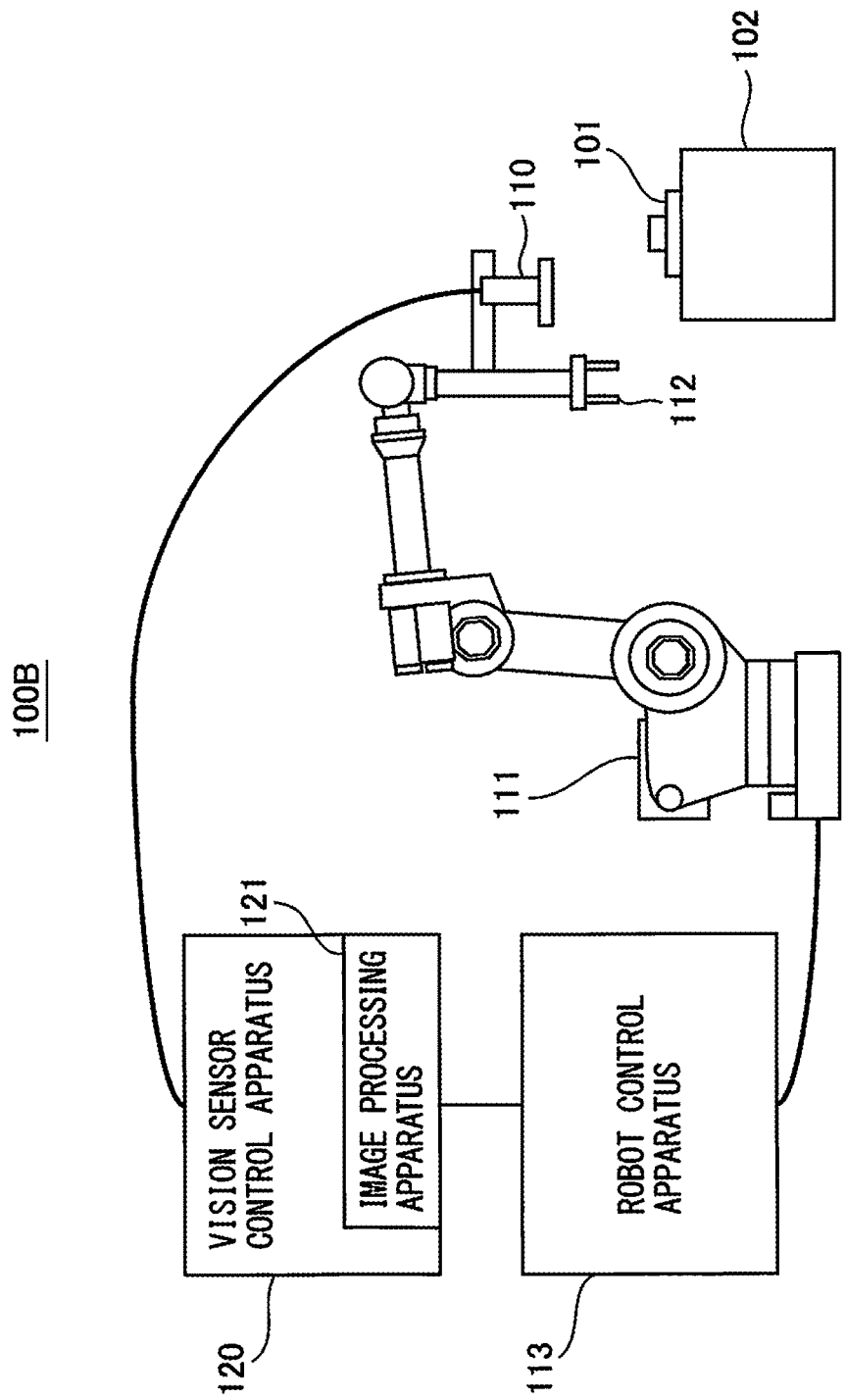
FIG. 2 is a schematic diagram illustrating an example of a robot system including a vision sensor control apparatus to which the image processing apparatus of the present invention is applied.

An embodiment of an apparatus and a method for image processing according to the present invention will be described below in detail with reference to the attached drawings. FIG. 1 is a schematic diagram illustrating an example of a machine tool system 100A including a vision sensor control apparatus to which an image processing apparatus of the present invention is applied and FIG. 2 is a schematic diagram illustrating an example of a robot system 100B including a vision sensor control apparatus to which the image processing apparatus of the present invention is applied.

FIG. 1 illustrates a target object 101, a bench 102, a vision sensor 110, a vision sensor control apparatus 120, and an image processing apparatus 121. The target object (workpiece) 101 may be made of various materials such as metal, wood, stone, resin, or the like and may be in various forms. The machine tool (the machine tool itself is not illustrated) is a machine to apply processing on the target object 101, such as cutting, drilling, grinding, polishing, rolling, forging, or bending and may be, for example, a lathe, a driller, a boring machine, a miller, a gear cutting machine, a grinder, or the like and, needless to say, may be a CNC (computer numerical control) machine tool.

As illustrated in FIG. 1, the vision sensor control apparatus 120 includes the image processing apparatus 121 and is configured to receive image data (input images) from the vision sensor 110 provided in a fixed position from which it is possible to capture the image of the target object 101 placed on the bench 102. The machine tool performs certain processing on the target object 101 in accordance with the output of the vision sensor control apparatus 120 and a certain inputted program.

The vision sensor 110 may be an electronic camera having an image pickup device to capture greyscale images or color images, such as a CCD (charge coupled device) and may be, for example, a stereo camera or 3D sensor that can obtain range images or 3D point groups. The 3D point groups may be on the outline of the target object 101 or may be on the surface of the target object 101.

FIG. 2 illustrates a robot 111, a hand 112, and a robot control apparatus 113. As illustrated in FIG. 2 the vision sensor control apparatus 120 includes the image processing apparatus 121 and is configured to receive image data (input images) of the image of the target object 101 placed on the bench 102, the image captured, for example, by the vision sensor 110 attached to a certain position such as an end of the arm of the robot 111. The robot control apparatus 113 controls the robot 111, the hand 112, and the like in accordance with the output of the vision sensor control apparatus 120 and a certain inputted program to perform a certain operation to the target object 101.

Figure 3:
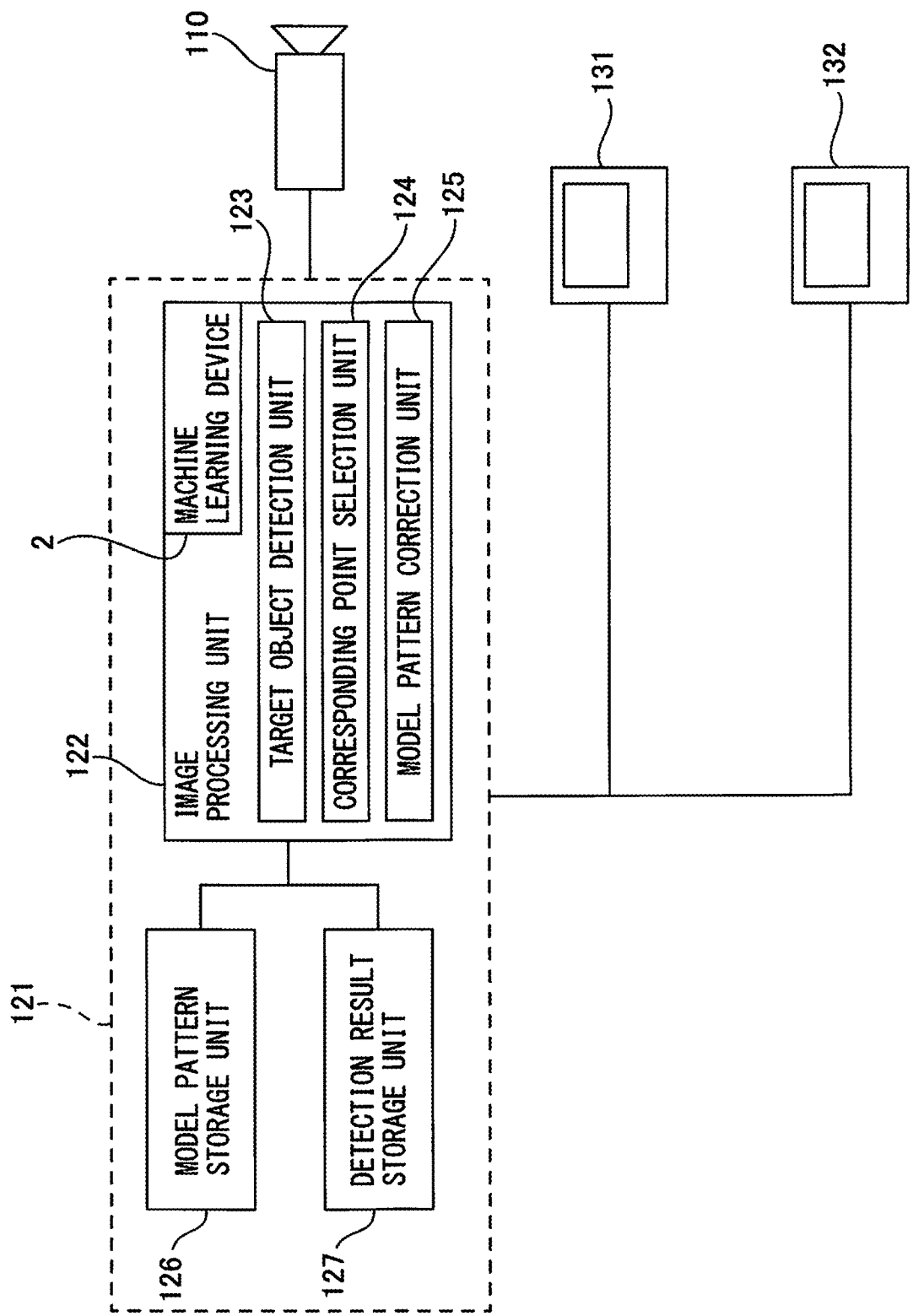
FIG. 3 is a block diagram illustrating the present embodiment of the image processing apparatus.

FIG. 3 is a block diagram illustrating the present embodiment of the image processing apparatus. As illustrated in FIG. 3, the image processing apparatus 121 includes an image processing unit 122 including a machine learning device 2, a model pattern storage unit 126, and a detection result storage unit 127. The image processing apparatus 121 is connected to the vision sensor 110, a control panel 131, a display device 132, and the like. The image processing unit 122 includes a target object detection unit 123, a corresponding point selection unit 124, and a model pattern correction unit 125 in addition to the machine learning device 2. The target object detection unit 123 detects an image of the target object from input data (input images) using a model pattern taught thereto and the corresponding point selection unit 124 selects corresponding points by evaluating the appropriateness of extracted feature points as the corresponding points to the feature points in the model pattern. The model pattern correction unit 125 performs correction processing of the model pattern.

The model pattern storage unit 126 stores, for example, a taught model pattern. The detection result storage unit 127 stores the result of detection of images of the target object from the input data (input images) by using the taught model pattern. The units included in the image processing apparatus 121 are implemented by software in a computer including an MPU (micro-processing unit), a ROM (read only memory), a RAM (random access memory), and the like. The machine learning device 2 will be described in detail later with reference to the drawings.

The vision sensor 110 is connected with the image processing apparatus 121 by a communication cable and outputs, for example, captured image data to the image processing apparatus 121. The control panel 131 is connected with the image processing apparatus 121 by a communication cable and used, for example, for making a setting or the like for the image processing apparatus 121 to detect images of the target object 101. The display device 132 is connected with the image processing apparatus 121 by a communication cable and displays, for example, images captured by the vision sensor 110 and the content of the setting made by using the control panel 131.

The vision sensor 110, the control panel 131, and the display device 132 may be integrated with the image processing apparatus 121 and, needless to say, various modifications and changes can be made. The machine learning device 2 (image processing apparatus 121) may be, for example, installed in the robot control apparatus 113 of the robot system 100B in FIG. 2 or may be an independent apparatus separate from the vision sensor control apparatus 120 and the robot control apparatus 113.

Figure 4:
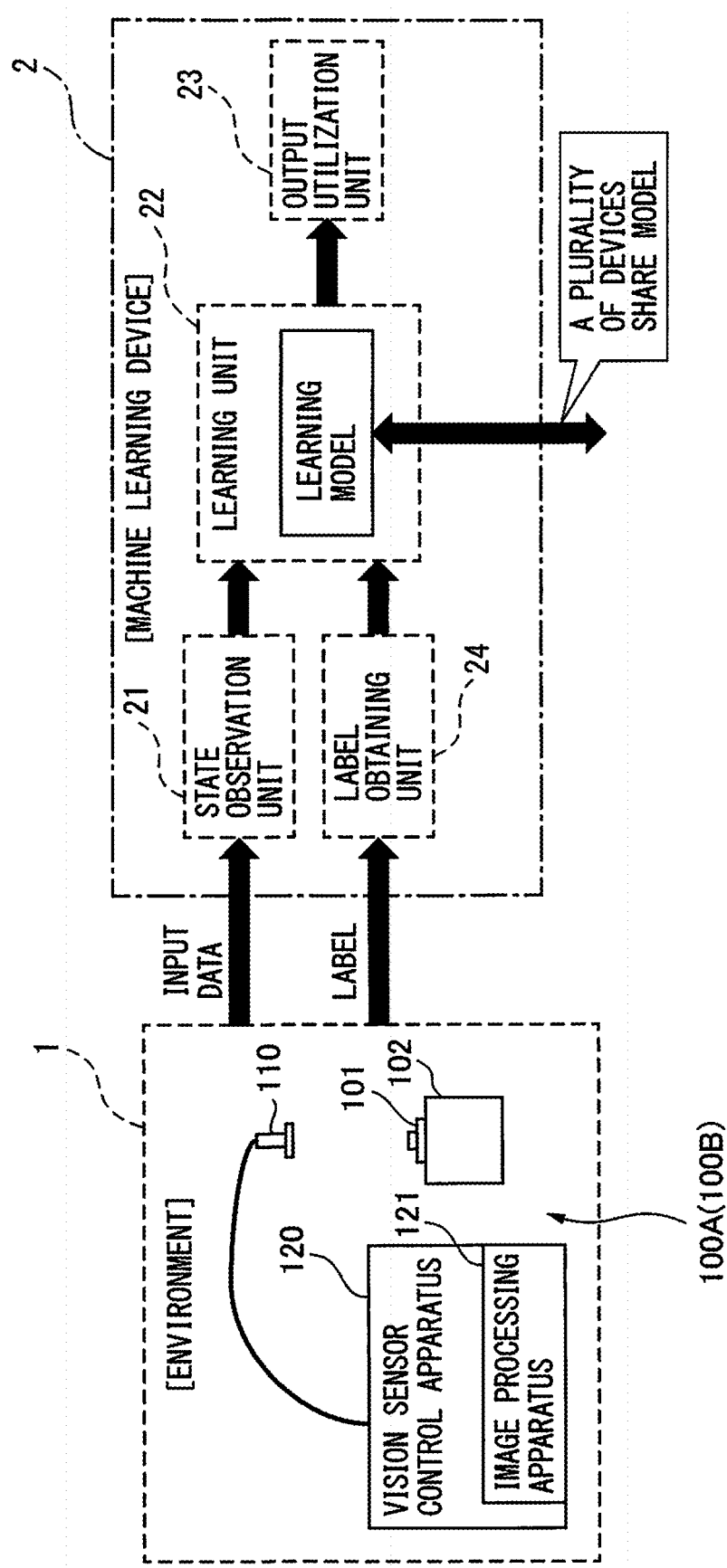
FIG. 4 is a schematic diagram illustrating an example of a machine learning device provided for the image processing apparatus of the present embodiment.

FIG. 4 is a schematic diagram illustrating an example of a machine learning device provided for the image processing apparatus of the present embodiment. As illustrated in FIG. 4, the machine learning device 2 includes a state observation unit 21, a learning unit 22, an output utilization unit 23, and a label obtaining unit 24. The state observation unit 21 receives input data from an environment 1 such as, for example, detection position, posture, size, and images of detected parts and the label obtaining unit 24 receives inputs indicating, for example, a success or failure in detection. The output utilization unit 23 calculates (computes), for example, a likelihood (probability of a rightly detected image of the target object or plausibility of an image of the target object, likelihood of successful detection). The output utilization unit 23 may have various functions to utilize the output of the machine learning unit 22 in addition to the calculation of a likelihood.

In other words, the label obtaining unit 24 obtains labels (teacher data) and, for example, receives at least one partial image cut out from an input image (image data), with teacher labels (OK/NG, Correct Detection/Incorrect Detection, integer, real number) attached to each partial image. The region from which to cut out a partial image may be, for example, a region surrounding the model pattern or may be a region predefined relative to the model pattern. The learning unit 22 receives the partial images cut out from the region and the teacher labels, performs learning (machine learning, in particular, supervised learning) to generate a learning model and, based on the generated learning model, calculates from the partial images a likelihood of an image of the target object 101.

The learning unit 22 performs "supervised learning" and generates a learning model based on the state variable (detection position, posture, size, and a partial image of the detected part) observed by the state observation unit 21 and the labels (success or failure in detection: OK/NG) obtained by the label obtaining unit 24. Although the environment 1 has been described in FIG. 4 using as an example the image processing apparatus 121 (vision sensor control apparatus 120) provided in the machine tool system 100A, needless to say, the environment 1 is not limited thereto.

Figure 5:
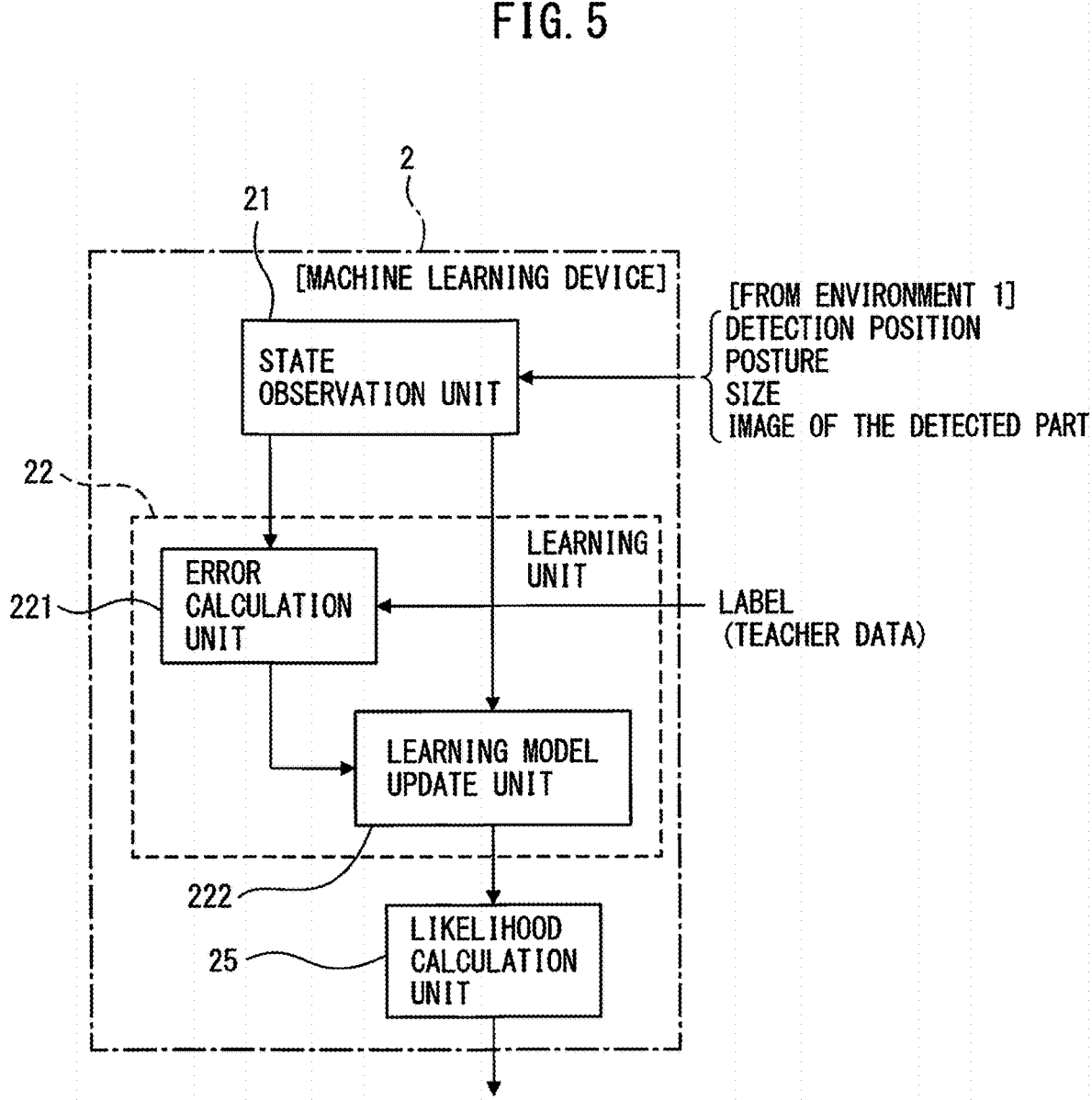
FIG. 5 is a block diagram illustrating an example of the machine learning device illustrated in FIG. 4.

FIG. 5 is a block diagram illustrating an example of the machine learning device illustrated in FIG. 4, in which the learning unit 22 is configured with an error calculation unit 221 and a learning model update unit 222. As illustrated in FIG. 5, the learning unit 22 includes an error calculation unit 221 to receive the output (state variable) of the state observation unit 21 and the labels (teacher data) to calculate errors and a learning model update unit 222 to receive the output of the state observation unit and the output of the error calculation unit 221 to update the learning model. The machine learning device 2 (learning unit 22) is not limited to those that perform supervised learning and, for example, may perform learning by using images labeled as Correct Detection (OK) and output as likelihood the degree of being different from the partial images used for the learning or may regard all detected images as having been correctly detected and perform learning (unsupervised learning) based on these. In other words, the machine learning device 2 can perform unsupervised learning by, for example, allowing narrower (stricter) ranges for the parameters to be used in the detection algorithm to obtain only the image data almost certain to turn out to be correct.

The labels inputted to the error calculation unit 221 correspond to the output of the label obtaining unit 24 in FIG. 4. The likelihood calculation unit 25 corresponds, for example, to the above-described output utilization unit 23 in FIG. 4 and calculates (computes) and outputs a likelihood (probability of a rightly detected image of the target object or plausibility of an image of the target object, likelihood of successful detection) based on the output of the learning unit 22 (learning model update unit 222). As described above, the image processing apparatus of the present embodiment allows appropriate calculation of a likelihood of an image of the target object and allows correct detection of the target object.

For the machine learning device 2, general-purpose computers or processors may be used and GPGPU (general-purpose computing on graphics processing units) or large-scale PC clustering, for example, may be applied for processing at a higher speed. The machine learning device 2 is communicable with at least one other machine learning device and can mutually exchange or share the learning model generated by the learning unit 22 of the machine learning device 2 with the at least one other machine learning device. It is needless to say that the machine learning device 2 (learning unit 22) includes a neural network, for example, constituted by the afore-mentioned GPGPU or the like.

To prevent, for example, a false positive detection of a background image as an image (Iw) of the target object 101, parts randomly obtained from the background image may be added to the teacher data as indicating unwanted detection. Further, the learning calculation and the calculation of a likelihood after the learning may be performed using the images converted by scaling, shear transformation, or the like based on the size in the detection result, as the images in the predefined regions with respect to the detection position and posture. More specifically, for example, when the target object is detected twice as large as the model pattern used for teaching, learning can be performed faster by magnifying the images of certain regions twofold.

In addition, the learning calculation and the calculation of the likelihood after the learning may be performed using features extracted by the same feature extraction method as used in the detection algorithm (for example, edge) or features extracted by a feature extraction method different from the methods used in the detection algorithm (for example, brightness or luminance gradient) from the images contained in predefined regions with respect to the detection position and posture, to perform learning faster than by using the images themselves.

Further, the learning may be performed step by step by generating teacher data allowing relatively large ranges for detection parameters (with large margins of error) at the initial stage and, as the learning progresses, gradually allowing smaller ranges for the detection parameters (with smaller margins of error). After the first stage, a likelihood is calculated by the calculation method newly learned and the results are used for subsequent stages. This allows the learning to be continued without too many instances of false detection.

By using the likelihood calculated by the method learned, a threshold value against which to determine whether or not an image of the target object has been detected can be established automatically. A likelihood may be a scalar quantity and may be a vector quantity. Alternatively, the machine learning device 2 does not output a likelihood but, for example, determines a success or failure in detection (OK/NG) and outputs labels directly. A processing by the image processing apparatus according to the present embodiment will be described in detail below.

Figure 6:
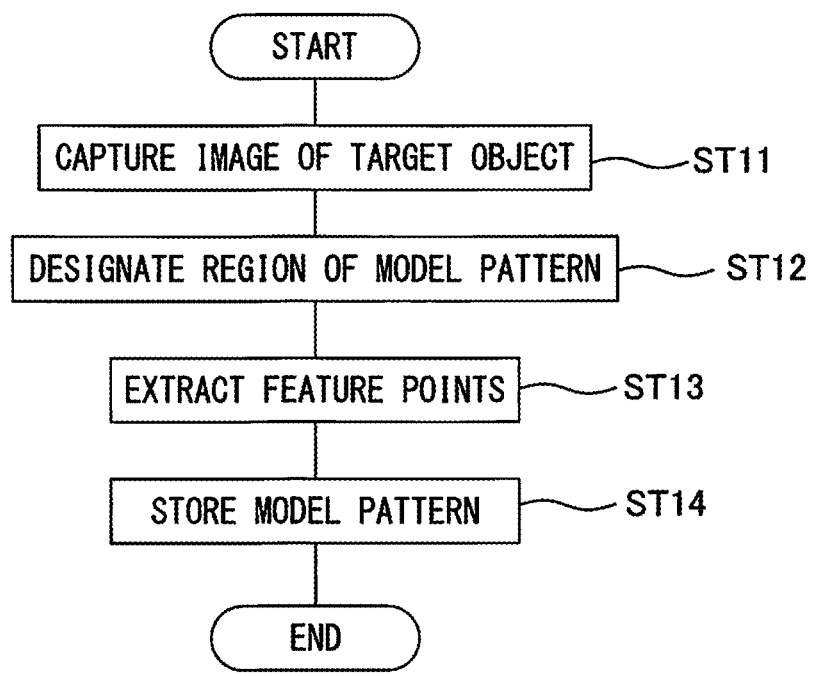
FIG. 6 is a flowchart illustrating an example of processing of model pattern generation by the image processing apparatus according to the present embodiment.
Figure 7:
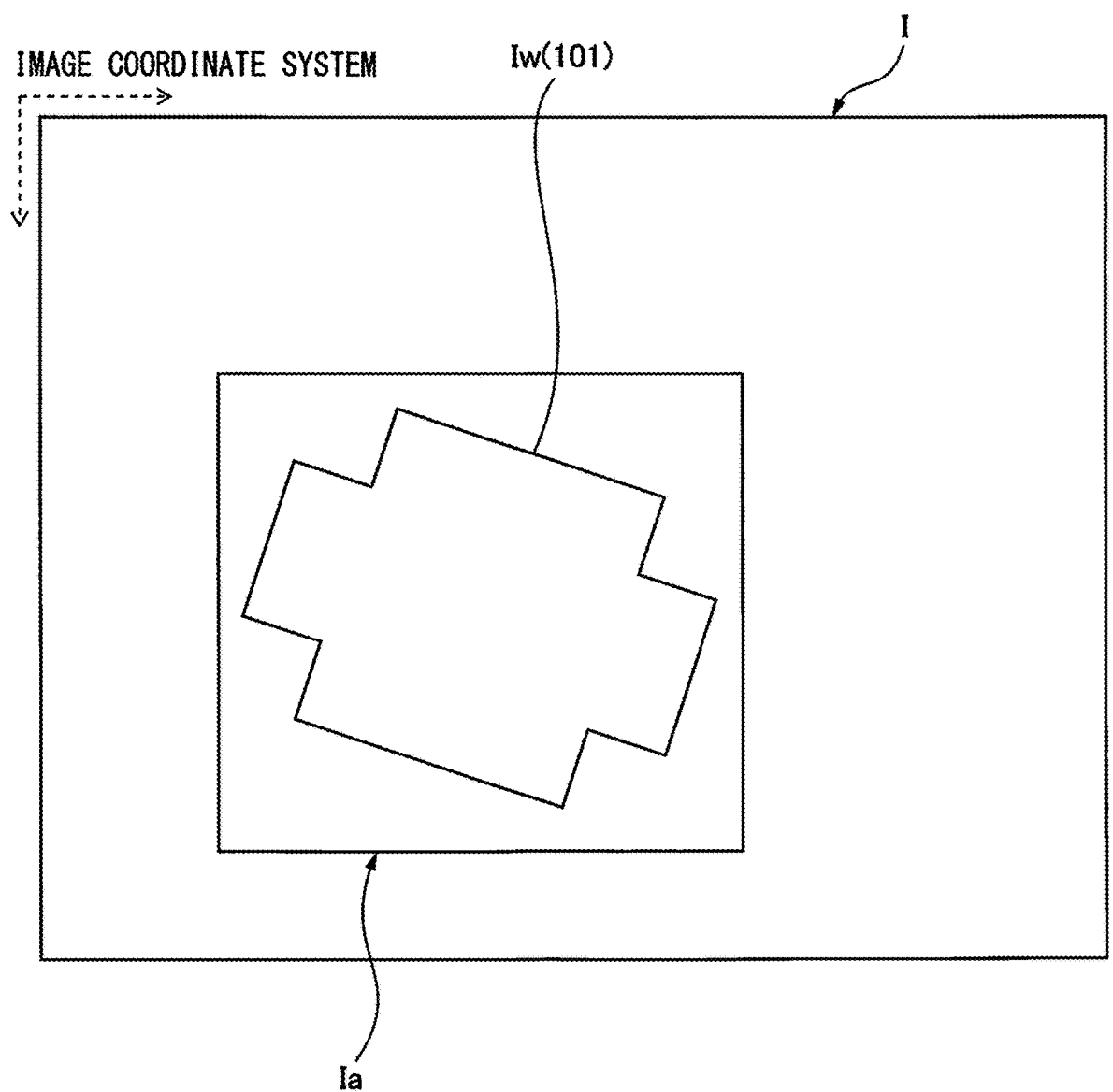
FIG. 7 is a diagram illustrating an example of a model pattern designation region in a captured image.

FIG. 6 is a flowchart illustrating an example of processing of model pattern generation by the image processing apparatus according to the present embodiment and FIG. 7 is a diagram illustrating an example of a model pattern designation region in a captured image. As illustrated in FIG. 6, when the processing of model pattern generation starts, for example, the vision sensor (camera) 110 captures an image of the target object 101 on the bench 102 in Step ST11, from which to generate a model pattern to be used for the teaching, and the processing proceeds to Step ST12. The vision sensor 110 is preferably disposed in the same position relative to the target object 101 as when the target object 101 is detected during the actual work and the like.

In Step ST12, as illustrated in FIG. 7, the region Ia containing the image Iw of the target object 101 in the captured image is defined by a rectangle and designated as a model pattern designation region. The processing of designating the model pattern region Ia in Step ST12 is not limited to a processing using a rectangular region as illustrated in FIG. 7 but, needless to say, it can be done by using a circle, an ellipse, or the like. In other words, in FIG. 7, an image coordinate system is defined for the captured image and a rectangular model pattern designation region Ia is designated in such a way as to include the image Iw of the target object 101 in the image coordinate system. The processing of designating the model pattern designation region Ia can be done by, for example, an operator (user) looking at the image on the display device 132 and inputting instructions to the control panel 131 but, for example, the image processing unit 122 may identify the parts with a high luminance gradient as forming the outline of the image Iw of the target object 101 and automatically designate a model pattern designation region Ia in such a way as to contain the image Iw within.

Proceeding to Step ST13, for example, edge points in the model pattern designation region Ia are extracted as feature points, and physical quantities such as the positions of the edge points, posture (direction of the luminance gradient), and the steepness of luminance gradient are calculated. Further, for example, a model pattern coordinate system may be defined in the designated region to convert the positions of the edge points and the posture expressed in values according to the image coordinate system to those expressed in values according to the model pattern coordinate system.

Proceeding to Step ST14, the physical quantities of the extracted edge points are stored in the model pattern storage unit 126 as feature points constituting the model pattern. Although edge points are used as feature points in the description above, needless to say, feature points are not limited to edge points. In addition, instead of extracting edge points, SIFT (scale-invariant feature transform) feature points, or the like from the image Iw of the target object 101 to obtain feature points for constituting a model pattern, geometric figures such as a line segment, a rectangle, and a circle may be disposed along the outline of the target object 101 appearing in the image Iw to generate a model pattern. In such a case, for example, feature points are established at appropriate intervals on the geometric figures forming the outline.

Further, a model pattern can be generated based on CAD data or the like. When 2D CAD data is used, a model pattern is generated in the same way as when geometric figures are used and, when 3D CAD is used, feature points are obtained by projecting the shape of the target object expressed by the CAD data onto an image and extracting feature points from the projected image.

Figure 8:
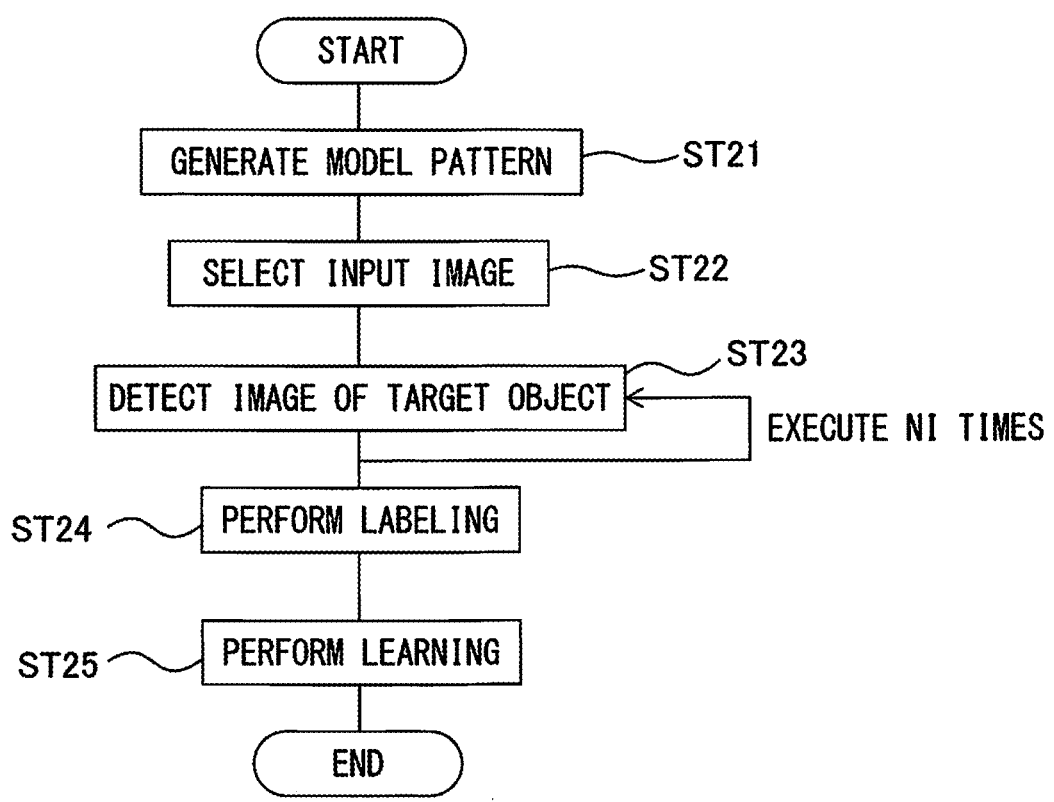
FIG. 8 is a flowchart illustrating an example of learning processing by the image processing apparatus according to the present embodiment.

FIG. 8 is a flowchart illustrating an example of learning processing by the image processing apparatus according to the present embodiment. As illustrated in FIG. 8, when the learning processing starts, first, a model pattern is generated (taught) in Step ST21, and then in Step ST22, input images are selected. In Step ST21, the model pattern is taught by using an image captured by the camera (vision sensor) 110 and, in Step ST21, a plurality of images containing an image Iw of the target object 101 are prepared as input images.

In Step ST23, detection is performed for the target object (101) for each of the input images and the processing then proceeds to Step ST24. It is desirable to obtain both correct instances and false instances of detection and so detection is performed allowing relatively large ranges for the detection parameters (with large margins of error). In Step ST23, the detection processing of the target object is performed, for example, NI times, NI being the number of the images. The detection parameters may include, for example, various elements such as range of sizes relative to the model pattern, range of shear transformation, range of detection positions, range of angles, ratio of edge points matching the edge points of the model pattern, threshold value of distance for assuming edge points of an image to be matching the edge points of the model pattern, and threshold value of edge points contrast.

Figure 9:
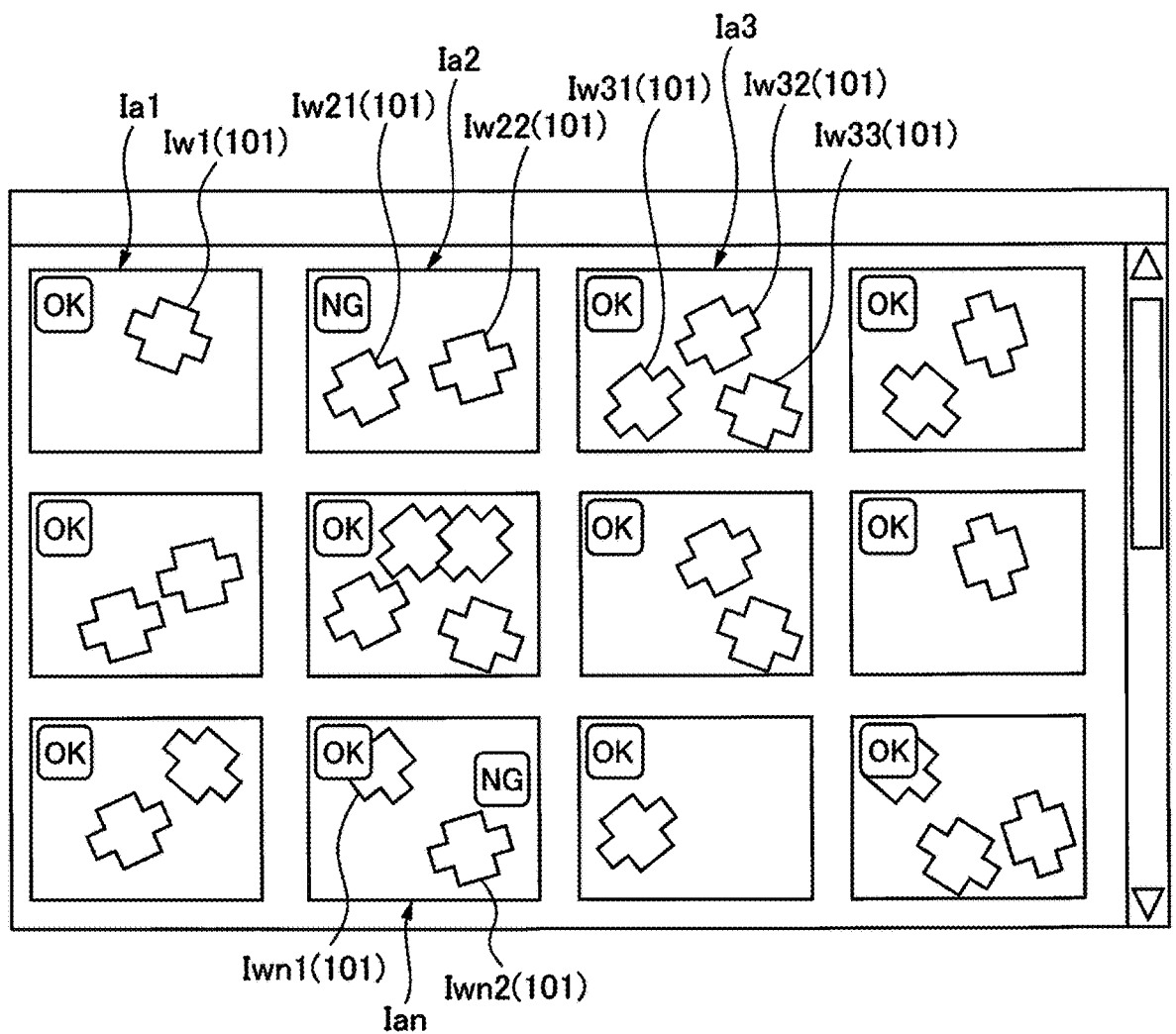
FIG. 9 is a diagram for a description of the labeling processing in the flowchart illustrated in FIG. 8.

In Step ST24, for example, the detection results are displayed on the display device 132 and the operator conducts visual checks and places labels of Correct Detection (OK) or Incorrect Detection (NG). FIG. 9 is a diagram for a description of the labeling processing in the flowchart illustrated in FIG. 8 and, as illustrated in FIG. 9, in the labeling processing in Step ST24, a label of either OK or NG is attached to the images Iw1, Iw21, Iw22, Iw31 to Iw33, . . . of the target object 101 contained in a plurality of model pattern designation regions Ia1, Ia2, Ia3, . . . . The learning may be performed using only the correct detection results by performing detection with relatively narrow ranges for the detection parameters. In such a case, visual checks (attaching labels of OK or NG) by the operator, for example, is not necessary. It is needless to say that the images Iw1, Iw21, Iw22, Iw31 to Iw33 . . . of the target object 101 may be taken out separately to attach a label of either OK or NG to each of the Iw1, Iw21, Iw22, Iw31 to Iw33, . . . that are so taken out.

In FIG. 9, the labels of OK, NG, and OK are respectively attached to the image Iw1, the images Iw21 and Iw22, and the images Iw31 to Iw33 of the target object 101 contained in the model pattern designation regions Ia1, Ia2, Ia3, the labels being attached to the image or the images as a whole in each model pattern designation region, but it is needless to say that, for example, as in the model pattern designation region Ian, the image Iwn1 of the target object 101 may be labeled as OK while Iwn2 may be labeled as NG. Labeling as OK or NG may be automatically performed, for example, based on a certain threshold value: a detection result indicating a value equal to or greater than the threshold value is labeled OK (Correct Detection) while a detection result indicating a value smaller than the threshold value is labeled NG (Incorrect Detection); however, for example, after labeling having been performed automatically, the operator may correct the labels.

Further, in Step ST25, learning (machine learning, for example, supervised learning) is performed and the processing ends. The learning in Step ST25 is performed by, for example, the machine learning device 2 described above with reference to FIG. 4 and FIG. 5. The learning processing in Step ST25 may be performed, for example, NR times, NR being the number of the model patterns, or a predefined number of times. For example, when detection is performed after the learning, a likelihood is calculated with the learned learning model to determine whether the detection is performed correctly. A likelihood may be calculated before the learning, for example, to calculate the errors to be used for backpropagation during the learning. A likelihood may be calculated after the learning, for example, to determine whether or not the images of the target object actually detected are the correct ones. For calculating the likelihood of an images of the target object before or after performing the learning, the images obtained by processing and converting the images contained in predefined regions with respect to the detected position and posture of the detected target object may be used.

Figure 10:
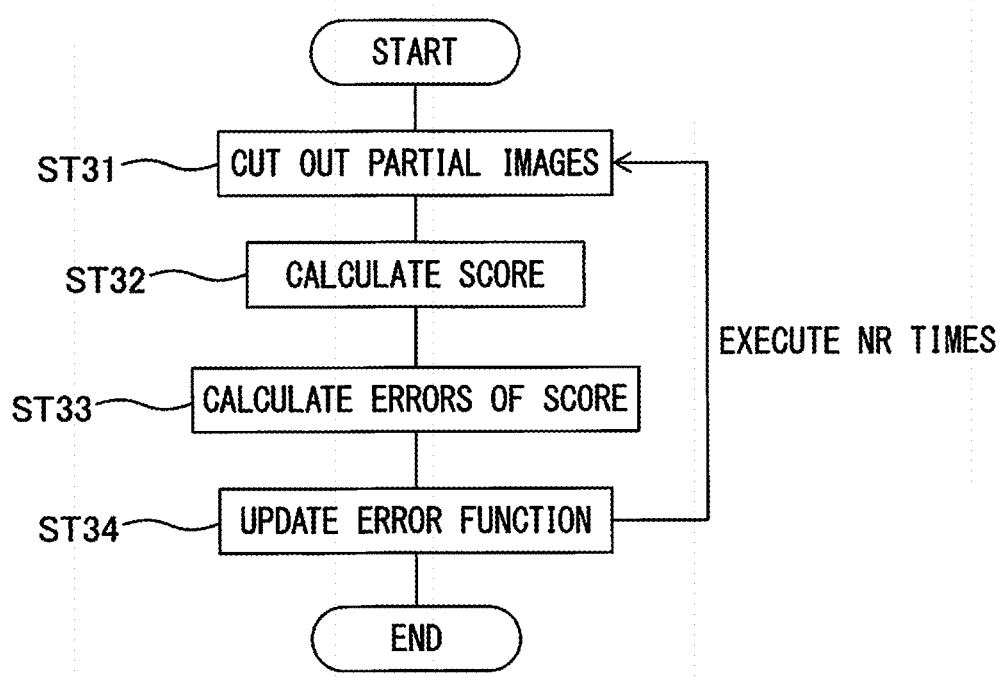
FIG. 10 is a flowchart for a description of an example of the learning processing in the flowchart illustrated in FIG. 8.
Figure 11:
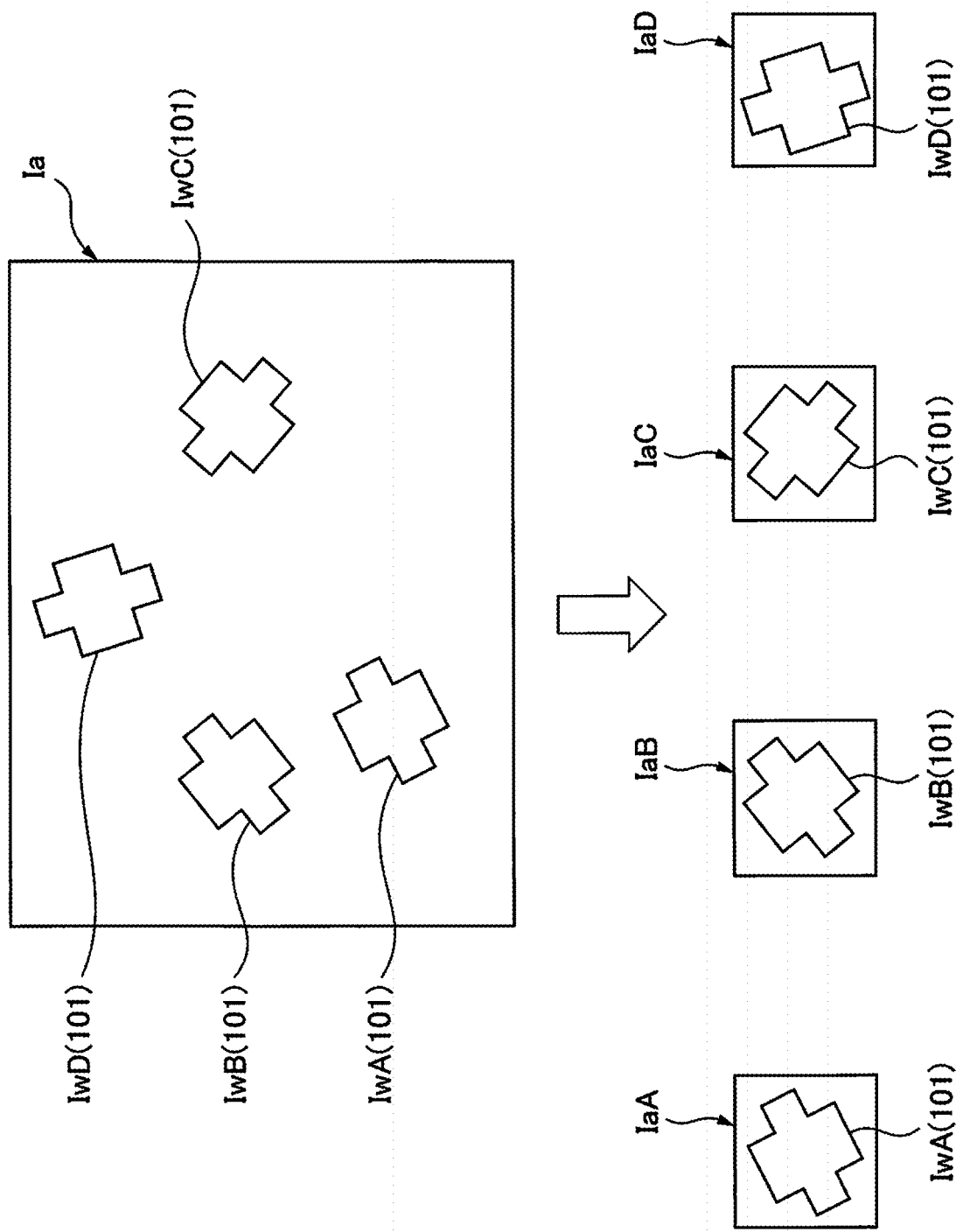
FIG. 11 is a diagram for a description of an example of the processing of cutting out partial images in the flowchart illustrated in FIG. 10.

FIG. 10 is a flowchart for a description of an example of the learning processing in the flowchart illustrated in FIG. 8 and for a description of an example of the learning (supervised learning) processing in Step ST25. FIG. 11 is a diagram for a description of an example of the processing of cutting out partial images in the flowchart illustrated in FIG. 10.

As illustrated in FIG. 10, when the learning processing starts, partial images in the predefined regions at the detected position and posture are cut out from the input image in Step ST31, and the processing proceeds to Step ST32. In other words, in Step ST31, when, for example, the input image (the image in the region Ia) contains four images IwA to IwD of the target object 101, four regions IaA, IaB, IaC, IaD, respectively containing one partial image IwA, IwB, IwC, IwD, are cut out as illustrated in FIG. 11.

In Step ST32, pixel values of the partial images are inputted to the learning model to calculate a likelihood. Scores may be set on a scale of, for example, from 0 to 1. In Step ST33, errors for the calculated likelihood are calculated by, for example, giving 1.0 for a Correct Detection (OK) label attached to a detection result and 0.0 for an Incorrect Detection (NG) label, and the processing proceeds to Step ST34. In Step ST34, the learning model (parameters of the learning model) is updated. In other words, in Step ST34, the errors are used for backpropagation in the learning model to update the parameters of the learning model. The processing in Steps ST31 to ST34 is performed NR times, NR being the number of results used for the learning.

For example, when the learning is completed, the machine learning device 2 that has completed learning can be used to calculate a likelihood. In other words, the detection of the target object from a newly obtained input image is performed using an existing detection algorithm, and the partial images containing an image of the target object are cut out from the input image. The partial images are then inputted to the machine learning device 2 to calculate a likelihood. Based on the calculated likelihood, it is possible to determine whether or not the images of the target object are the results of correct detection. This allows for avoiding to use incorrect detection results and also for determining whether a detected target object is a good or defective product.

Figure 12:
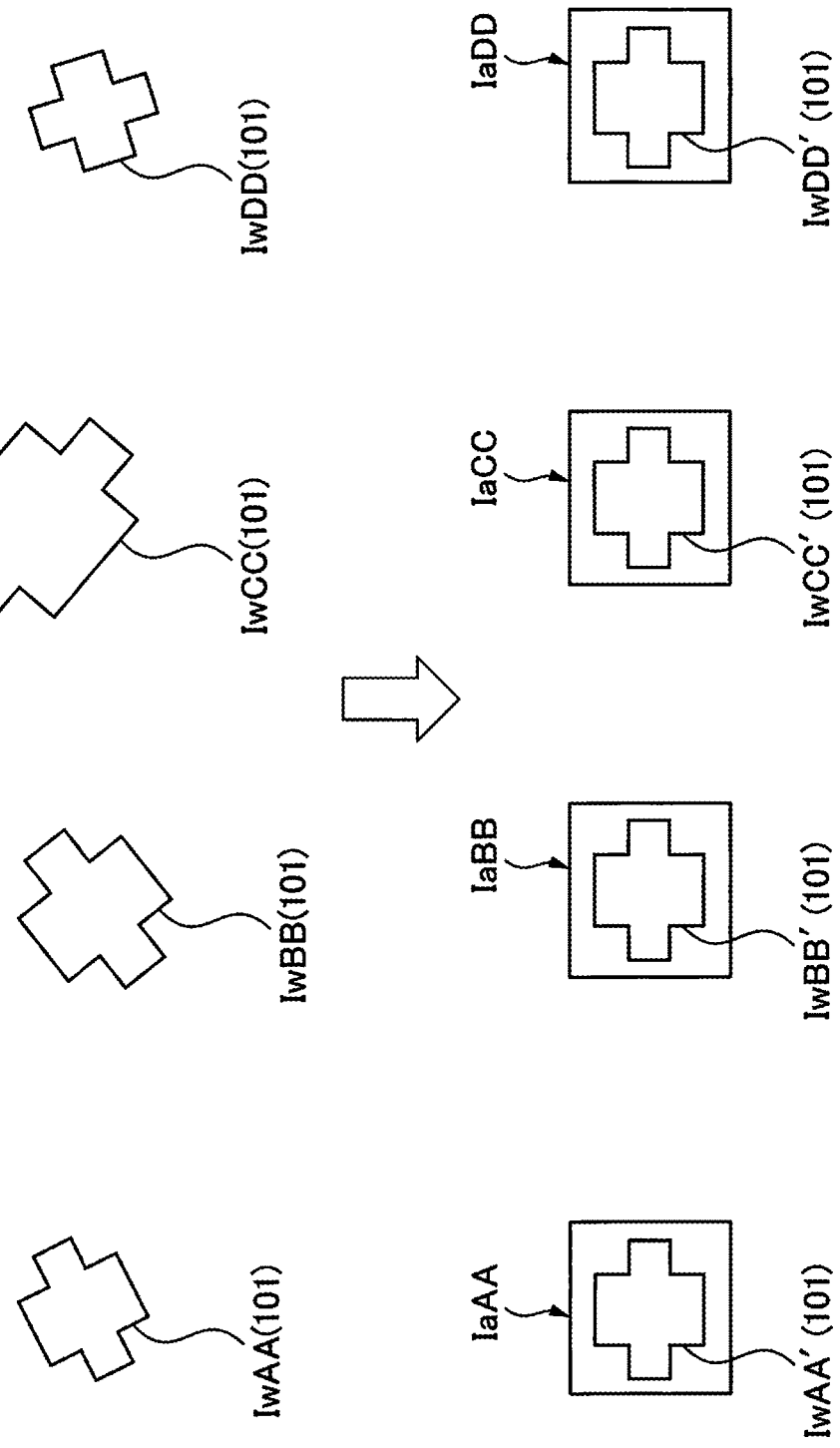
FIG. 12 is a diagram for a description of a modified example of the processing in the image processing apparatus of the present embodiment.

FIG. 12 is a diagram for a description of a modified example of the processing in the image processing apparatus of the present embodiment. After cutting out from the input image the partial images of the predefined regions with respect to the detected position and posture, the partial images may be transformed, for example, to adjust their positions, postures, sizes, distortions to the model pattern. In other words, as illustrated in FIG. 12, four partial images IwAA, IwBB, IwCC, IwDD of the target object 101, which are obtained by cutting out from the input image (Ia) the partial images of predefined region with respect to the detected position and posture, are transformed (standardized) to adjust their positions, postures, sizes, and distortions to the model pattern, which results in four regions IaAA, IaBB, IaCC, IaDD respectively containing standardized partial images IwAA', IwBB', IwCC', IwDD'.

This ensures that the pixel values inputted to the learning model for the same input category are the values of the same parts (corresponding parts). When, for example, the detection position can be obtained in a unit smaller than one pixel (picture element), the partial images may be shifted in a unit smaller than one pixel.

Further, after cutting out the partial images, feature quantities are extracted from the partial images and inputted to the learning model. The feature quantities may be more than one kind and may be, for example, luminance gradient, direction of luminance gradient, edge points, and the like. In addition, the feature quantities extracted from the partial images and the partial images may be inputted to the learning model at the same time.

Further, in performing learning, exclusion regions may be designated, which are not to be used for the learning. Designating exclusion regions on the model pattern as described above enables designation regions to be shifted according to the detection results. This allows exclusion regions to be designated for the partial images and, for example, when the partial images have undergone rotation and position adjustment, exclusion regions can be used as they are.

Further, in another modified example, the learning processing may be performed step by step. In other words, teacher data are generated allowing relatively large ranges for the detection parameters (with large margins of error) initially (at the initial stage) and, as the learning progresses (proceeding to subsequent stages), allowing smaller ranges for the detection parameters (with smaller margins of error) to perform the learning further.

More specifically, when teacher data are generated at first, for example, the size is set at 0.9 to 1.1 and the ratio of edge correspondence at not less than 60%. When the teacher data for the next round of learning are generated, for example, the size is set at from 0.95 to 1.05 and the ratio of edge correspondence is set at 80%. It is needless to say that these values are presented merely as an example.

Figure 13A:
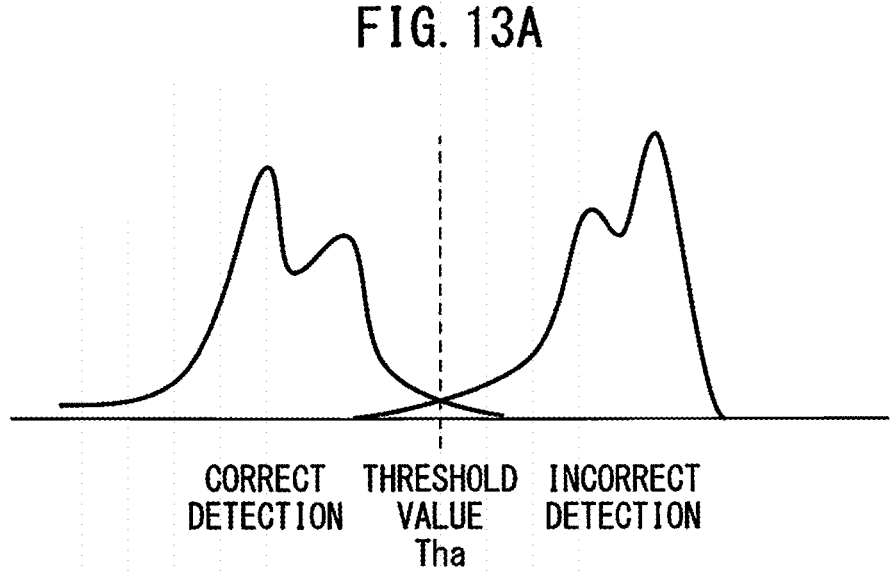
FIGS. 13A and 13B are graphs for a description of another modified example of the processing in the image processing apparatus of the present embodiment.
Figure 13B:
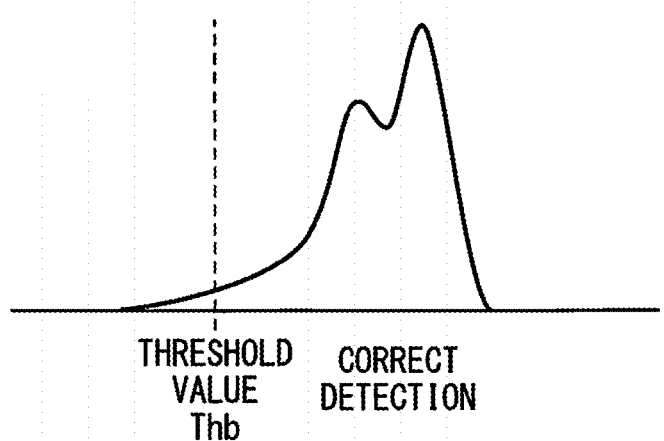

FIGS. 13A and 13B are graphs for a description of another modified example of the processing in the image processing apparatus of the present embodiment and FIG. 13A illustrates a case in which a classification is made between instances of correct detection (OK) and those of incorrect detection (NG) by a threshold value Tha while FIG. 13B illustrates a case in which classification of instances of correct detection is made by a threshold value Thb. In still another example of processing in the image processing apparatus of the present embodiment, for example, the threshold value may be automatically established for determining whether or not an image of the target object has been detected according to the likelihood outputted by the machine learning device 2. This can be done, for example, by the following procedure.

First, the partial images in the learning data are inputted one by one to the machine learning device 2 to obtain degrees of correspondence. The obtained degrees of correspondence are stored after being classified based on whether the partial images are labeled Correct Detection or Incorrect Detection. Further, the probability distribution is calculated for a set consisting of the degrees of correspondence with Correct Detection labels and for a set consisting of the degrees of correspondence with Incorrect Detection labels. For calculating the probability distribution, for example, normal mixed distribution may be used. A threshold value for classifying instances of correct detection and incorrect detection may then be calculated from the calculated probability distribution.

As illustrated in in FIG. 13A, for example, the threshold value may be set at a value Tha, at which two probability distribution curves for correct detection and incorrect detection intersect, or may be set at a value Thb, over which the probability of an instance of correct detection exceeds a predefined value in the probability distribution.

Further, regions that are not the detection target in the input image may be added to the teacher data as examples of incorrect detection. This can be done, for example, by the following procedure. First, generate detection results randomly. Next, confirm that the detection results are away from the correct results with a certain range or more. For example, when the detection results are given in position, angle, and scale, confirm that they are away at a certain distance or more in the position, angle, and scale spaces. Then store the detection results with an Incorrect Detection label attached.

This will, for example, make it difficult to detect regions that are not the image of the target object in the input image. In addition, by performing detection with relatively narrow ranges for the detection parameters and treating the detection result as being correct and by performing learning based on these correct detection results together with the incorrect detection results automatically added, learning (supervised learning) can be performed, for example, without an operator attaching labels.

The apparatus and a method for image processing according to the present invention has an advantageous effects of properly calculating a likelihood of an image of the target object to correctly detect the target object.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An image processing apparatus for receiving an input image and detecting an image of a target object based on a detection algorithm, comprising:
   a processor configured to
      perform learning by using a plurality of partial images cut out from each of at least one input image, based on a result of detection of the image of the target object; and
      calculate a likelihood of the image of the target object, wherein
   the processor is configured to perform the learning step by step, allowing relatively large ranges comprising first margins of error for detection parameters at an initial stage and gradually allowing smaller ranges comprising second margins of error smaller than the first margins of error for the detection parameters as the learning progresses to subsequent stages, and
   the processor is further configured to
      observe, as a state variable, at least one of detection position, posture, size, and an image of a detected part related to the target object,
      obtain labels indicating correct detection or incorrect detection to be attached to each of the plurality of partial images,
      generate a learning model for calculating the likelihood of the image of the target object, based on the observed state variable and the obtained labels,
      perform supervised learning,
      calculate errors based on the observed state variable and the obtained labels, and
      update the learning model based on the observed state variable and the calculated errors.

2. The image processing apparatus according to claim 1, wherein
   the processor is further configured to attach a label indicating incorrect detection to a partial image cut out from a region in the input image which region contains no image of the target object.

3. The image processing apparatus according to claim 1, wherein
   the processor is further configured to use an image obtained by converting an image contained in a predefined region with respect to a position and posture of the detected target object to calculate the likelihood of the image of the target object before or after performing the learning.

4. The image processing apparatus according to claim 1, wherein
   the processor is further configured to receive features extracted by a same feature extraction method as used in the detection algorithm from an image contained in a predefined region with respect to a position and posture of the detected target object to calculate the likelihood of the image of the target object before or after performing the learning, and calculate the likelihood of the image of the target object.

5. The image processing apparatus according to claim 1, wherein the processor is further configured to receive features extracted by a feature extraction method different from methods used in the detection algorithm from an image contained in a predefined region with respect to a position and posture of the detected target object to calculate the likelihood of the image of the target object before or after performing the learning.

6. The image processing apparatus according to claim 1, wherein
a threshold value against which to determine whether or not the image has been detected is established automatically based on the likelihood outputted by the processor.

7. The image processing apparatus according to claim 1, wherein
the processor is further configured to communicate with at least one other processor and mutually exchange or share the generated learning model with the at least one other processor.

8. An image processing method for receiving an input image and detecting an image of a target object based on a detection algorithm, comprising:
performing machine learning by using a plurality of partial images cut out from at least one input image based on a detection result of the image of the target object to calculate a likelihood of the image of the target object, wherein
the calculating the likelihood of the image of the target object comprises performing the machine learning step by step, allowing relatively large ranges comprising first margins of error for detection parameters at an initial stage and gradually allowing smaller ranges comprising second margins of error smaller than the first margins of error for the detection parameters as the machine learning progresses to subsequent stages, and
the performing of machine learning to calculate the likelihood of the image of the target object comprises:
observing, as a state variable, at least one of detection position, posture, size, and an image of a detected part related to the target object;
obtaining labels indicating correct detection or incorrect detection to be attached to each of the plurality of partial images; and
generating a learning model with which to calculate the likelihood of the image of the target object, based on the state variable and the labels, to perform supervised learning, wherein the generating of the learning model comprises:
calculating errors based on the state variable and the labels; and
updating the learning model based on the state variable and the calculated errors.

9. The image processing apparatus according to claim 1, wherein
the plurality of partial images are obtained by standardizing to adjust at least one of their sizes and distortions, after cutting out from at least one input image of predefined regions with respect to a detected position and posture.

10. The image processing method according to claim 8, wherein
the plurality of partial images are obtained by standardizing to adjust at least one of their sizes and distortions, after cutting out from at least one input image of predefined regions with respect to a detected position and posture.

* * * * *